May 14, 1940.  T. W. EDWARDS ET AL  2,200,875
MIXER FOR PLASTIC MATERIAL
Filed April 20, 1938   2 Sheets-Sheet 1

INVENTORS
Terry W. Edwards
AND
Charles H. Nagel
BY
ATTORNEYS

May 14, 1940.  T. W. EDWARDS ET AL  2,200,875
MIXER FOR PLASTIC MATERIAL
Filed April 20, 1938   2 Sheets-Sheet 2

INVENTOR
Terry W. Edwards
AND
Charles H. Nagel
BY
ATTORNEYS

Patented May 14, 1940

2,200,875

UNITED STATES PATENT OFFICE 2,200,875

MIXER FOR PLASTIC MATERIAL

Terry W. Edwards and Charles H. Nagel, Akron, Ohio, assignors to The Firestone Tire & Rubber Company, Akron, Ohio, a corporation of Ohio Application April 20, 1938, Serial No. 203,078

4 Claims. (Cl. 18—2)

This invention relates to mixers for plastic material, and more especially it relates to rubber-working apparatus, such as mixing mills and warming mills, provided with automatically operating mechanism for stripping the plastic sheet of material from one of the mill rolls and feeding it back into the bite of the rolls, whereby intimate mixing of the constituent elements of a rubber batch is effected.

The invention is an improvement upon the apparatus constituting the subject matter of the U. S. patent to H. D. Stevens, No. 2,032,073, issued February 25, 1936. In the apparatus of the aforesaid patent, a two-roll rubber-mixing mill is provided with a flat rectangular scraper blade engageable with one of the mill rolls for scraping plastic rubber therefrom, said blade being carried upon the piston rod of a double acting fluid pressure operated cylinder, whereby the blade may be lifted out of engagement with the mill roll, and lowered into engagement therewith. Means also is provided for moving the scraper cylinder laterally, back and forth, parallel to the axes of the mill rolls, including means for charging and discharging opposite ends of the cylinder at determinate points in its course of lateral movement.

The chief objects of this invention are to provide improved means for propelling the scraper cylinder laterally, longitudinally of the mill rolls; and to provide improved means for effecting operation of the said cylinder, automatically, at determinate points along its course of lateral movement. More specifically, the invention aims to effect the lateral feeding of the scraper cylinder by means of power transmitted directly from the drive of the rotating mill rolls. Other objects will be manifest as the specification proceeds.

Figure 4:
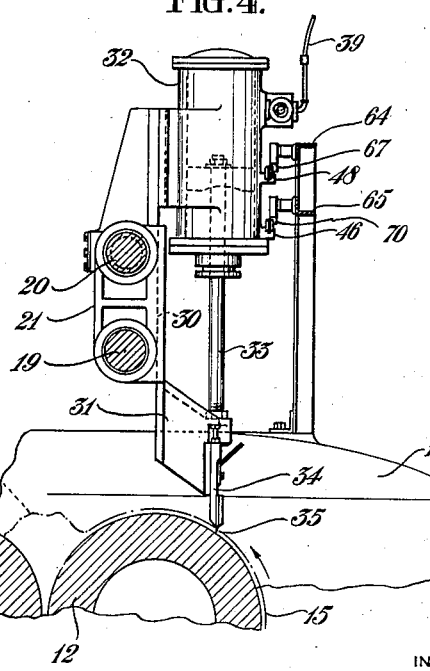
Figure 4 is a section on the line 4—4 of Figure 2.

Referring to the drawings, there is shown a rubber-working mill comprising end-frames 10, 10 in which are journaled a pair of laterally disposed horizontal rolls 11, 12, that are geared together by respective gears 13, 14 and driven in unison by the usual driving means (not shown). The rolls 11, 12 are adapted to form a sheet 15 of plastic composition from a bank 16 of such composition that is fed into the bite between said rolls, as indicated in broken lines in Figure 4, the sheet 15 therein being shown as formed on the front roll 12.

Mounted upon the top of end frames 10 are respective brackets 18, 18. The latter provide end-supports for a guide-bar 19 that is fixedly secured therein, and also include journals for a feed-shaft 20 that is positioned above said guide-bar. The guide-bar 19 and feed shaft 20 are parallel to each other and to the roll 12, and are disposed in a vertical plane with the latter. The guide-bar and feed shaft slidably support a carriage 21 that is movable longitudinally thereof, the feed shaft being formed with a return screw 22 that engages said carriage in the usual manner and effects lateral back and forth traverse of the carriage when the feed shaft is rotated. For rotating feed shaft 20, a sprocket 23 is journaled upon an overhanging end portion thereof, and a sprocket chain 24 provides driving connection between said sprocket and a sprocket 25 secured to the hub of gear 13. A sliding clutch 26 is keyed to feed shaft 20, beside sprocket 24, and adapted for operative engagement with the latter, said clutch being provided with a shipper lever 27 by which it is manually operated to connect the sprocket 23 with shaft 20, and to disconnect it therefrom.

The front face of carriage 21 is formed with a vertical dovetail slideway 30 in which is mounted a slide 31. Vertical movement of the slide 31 is effected by means of a superposed, vertically positioned, double-acting, fluid pressure operated cylinder 32 that is carried upon an upwardly extending portion of the carriage 21, the piston rod 33 of cylinder 32 extending downwardly and having its outer end connected to the slide 31 near the lower end of the latter. The lower end of slide 31 carries a holder 34 for a scraper blade 35 that engages the surface of mill roll 12, on the upwardly moving side thereof, when the slide 31 is in its lowered position, as shown. Said scraper blade is rectangular in shape and has at least one of its longitudinal margins sharpened, the end margins of the blade being blunt and unsharpened. It is the sharpened margin of the blade that engages the mill roll.

Operation of the fluid pressure cylinder 32 is controlled by a valve 38 that is mounted upon the front of said cylinder, and means is provided for operating the valve automatically, as the carriage 21 moves back and forth over the mill rolls, to effect the raising and lowering of the blade 35 at determinate positions along the course of the carriage. Pressure fluid, specifically compressed air, is delivered to the valve 38 through a pipe 39, when pipe is flexible to permit the back and forth movement of the cylinder 32. From the valve 38 a pipe 40 extends to the upper end of cylinder 32, above the piston thereof, and a pipe 41 extends from the valve to the lower end of the cylinder, below the piston thereof. Exhaust pipes 42, 43 for the upper and lower ends of the cylinder respectively extend from the valve to a common muffler 44 carried by said pipes. From one end of valve 38 a relatively small pipe 45 extends to a lever-operated bleeder valve 46 mounted upon the front of cylinder 32, near the lower end thereof, and a similar pipe 47 extends from the opposite end of valve 38 to a bleeeder valve 48 mounted upon the front of cylinder 32, near the middle thereof.

Figure 5:
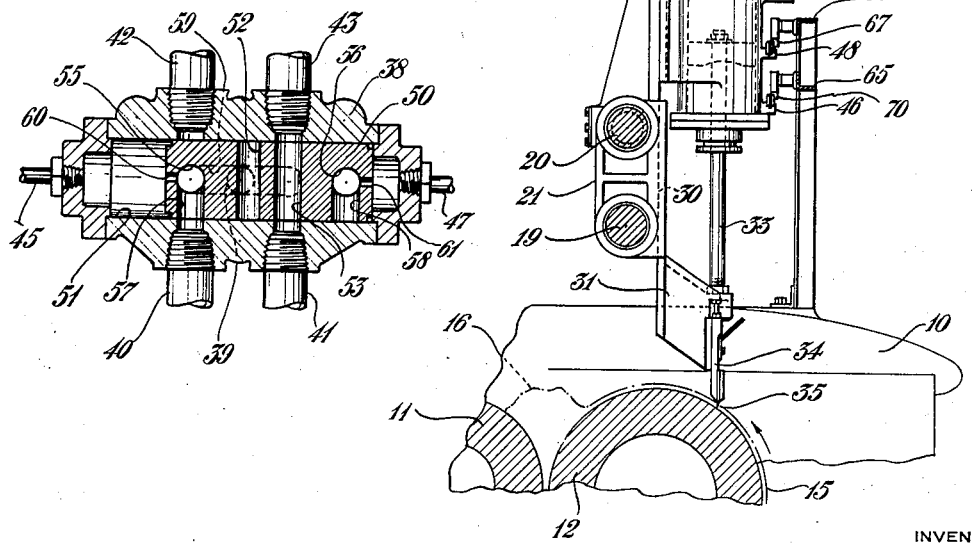
Figure 5 is a diametric, longitudinal section through a valve that controls the operation of a fluid pressure cylinder.

The valve 38 is a standard article of commerce known as a four-way, balanced, piston type valve, the details thereof being most clearly shown in Figure 5. The valve 38 comprises a reciprocable piston 50 mounted in a cylindrical bore 51 in the valve body, said bore being longer than the piston to permit axial movement of the latter. The piston 50 is formed in its medial region with two parallel diametric bores or passages 52, 53, the latter being shown in alignment with the ports of pipes 41, 43, with the piston 50 in its right hand position, the arrangement being such that fluid from the lower end of cylinder 32 will exhaust through pipes 41, 43. When the piston is in its left hand position, passage 53 is aligned with the ports of pipes 40, 42 and fluid in the upper end of the cylinder will exhaust therethrough. Nearer its ends the piston 50 is formed with respective diametric bores or passages 55, 56 that are disposed transversely with relation to passages 52, 53. The passages 55, 56 are intersected by respective passages 57, 58 that extend only from the lower side of the piston, and are aligned with the ports of the respective pipes 40, 41 in the alternative positions of the piston 50. The body portion of the valve is formed with an elongate, longitudinally extending groove 59 which is open to the valve bore 51, as shown in broken lines in Figure 5, which groove intersects the inlet port of the supply pipe 39. The arrangement is such that when the piston 50 is in the right hand position shown, the passage 55 is in communication with groove 59 whereby pressure fluid from the latter may pass to the upper end of cylinder 32 through valve passage 57 and pipe 40. When the piston is in the left hand position, fluid will flow to the lower end of cylinder 32 through passages 56, 58, and pipe 41. Relatively small ducts 60, 61 disposed axially of the piston 50 connect the respective passages 55, 56 therein with the adjacent end faces of the piston, whereby fluid will flow into the spaces between the ends of the piston and the ends of bore 51, and thereby communicate through pipes 45, 47 with the respective bleeder valves 46 and 48.

Reciprocation of the valve piston 50 is effected by the opening of the said bleeder valves, as presently will be explained, and means is provided for opening said bleeder valves in proper sequence and at determinate points along the course of the carriage 21. To this end an open framework comprising parallel horizontal rails or bars 64, 65 is mounted upon the end-frames 10 of the mill, said rails being positioned in front of the cylinder 32. Depending from the upper rail 64 adjacent the opposite ends thereof are pivotally mounted fingers or dogs 67, 67 that project into the path of the operating lever of the bleeder valve 48. Pins 68 beside the respective dogs 67 limit the pivotal movement of the latter to one direction only, and said pins are at the sides of the dogs nearest the adjacent ends of rail 64. The arrangement is such that the dogs 67 effect the opening of bleeder valve 48 only when the carriage 21 is nearing the end of its movement in one direction, the dogs tilting on their pivots when engaged by the valve-levers moving in the opposite direction so as to have no effect on the bleeder valves. In like manner the lower rail 65 is provided with depending dogs 70, 70 backed by respective stop pins 71, said dogs 70 extending into the path of the operating lever of the bleeder valve 46. The dogs 70 are positioned more remote from the ends of the frame-rail than are dogs 67 so that bleeder valve 46 will be opened prior to the opening of bleeder valve 48 in every traverse of the mill by carriage 21, both valves being opened, however, relatively near the end of the traverse. The operating lever of the bleeder valve 46 may be provided with a pull chain 72 by which the valve manually may be opened, upon occasion.

Figure 1:
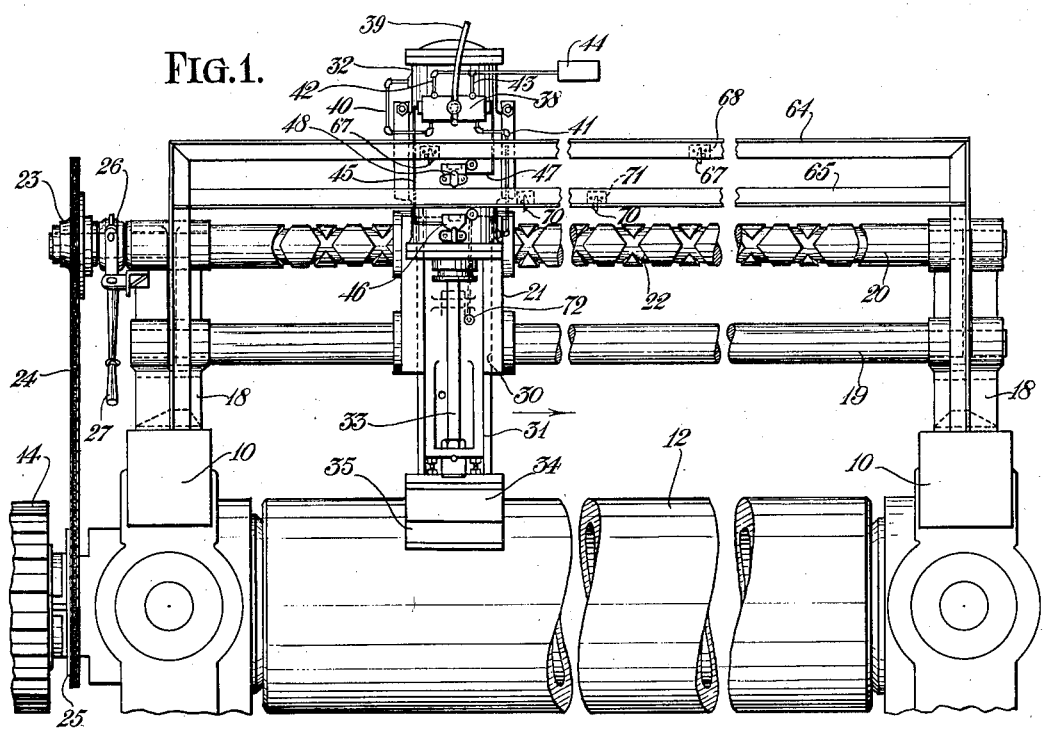
Figure 1 is a fragmentary front elevation of apparatus embodying the invention, in its preferred form.
Figure 2:
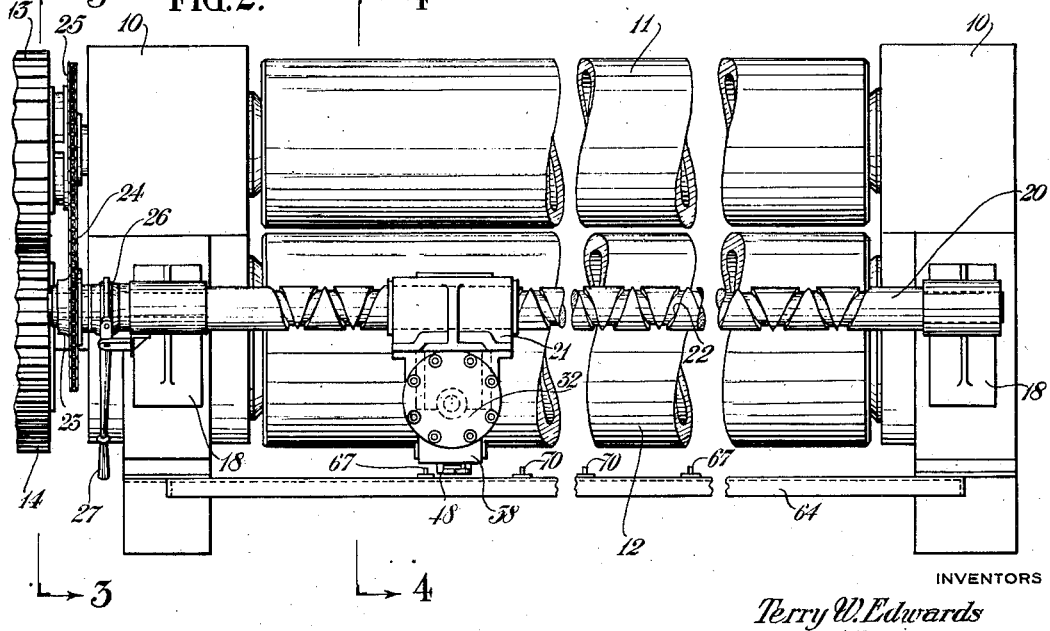
Figure 2 is a plan view thereof.
Figure 3:
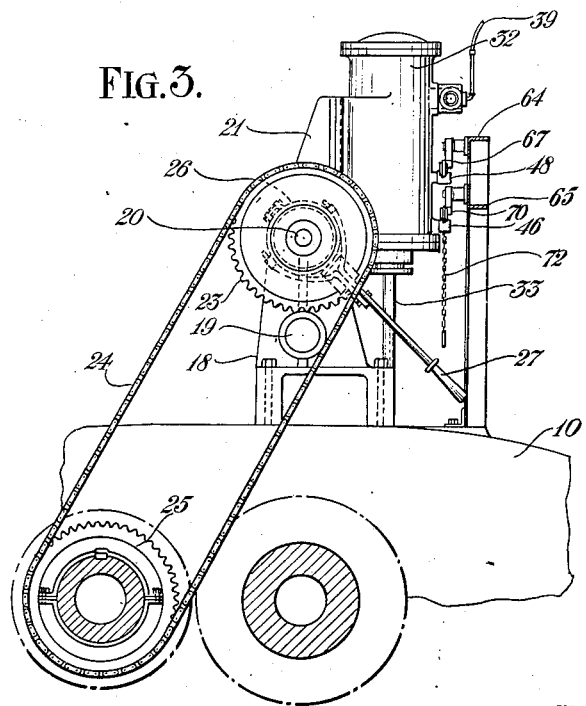
Figure 3 is an end elevation as viewed from the line 3—3 of Figure 2.

In the operation of the apparatus, the mill rolls 11, 12 are driven in the usual manner to sheet the plastic rubber composition in the bank 16 thereof and to form said sheet in the manner of a sleeve of rubber upon the roll 12. The shipper lever 27 is moved to the position that causes clutch 26 to couple sprocket 23 to feed-shaft 20, to drive the latter, whereby carriage 21, and cylinder 32 thereon are moved back and forth, longitudinally of mill roll 12 above which they are positioned. Fluid under pressure is present in the supply pipe 39 at all times. Figure 1 shows the carriage and cylinder moving toward the right, as indicated by the arrow, the upper end of said cylinder being charged and the blade being in its lowered, operative position in engagement with the surface of mill-roll 12, where it scrapes the sleeve of rubber 15 therefrom in the manner set forth in detail in the U. S. patent aforementioned.

When the various elements are in the positions shown in Figure 1, the valve piston 50 is in the position shown in Figure 5. As shown in the said figure, that portion of the bore 51 to the left of the piston 50 is filled with pressure fluid that enters therein through the duct 60 of the piston. As the carriage 21 moves to the right from the position shown in Figure 1, the first dog 70 encountered by the operating lever of bleeder valve 46 merely tilts on its pivot so that the valve lever passes thereunder without being depressed. As the carriage approaches the right-hand end of its course, the operating lever of bleeder valve 46 encounters the second dog 70, which is unyielding because of the pin 71 behind it, said dog thereby depressing said lever and opening the bleeder valve. This causes evacuation of the air in the end of bore 50 of valve 38, and causes said piston to move to the opposite end of the valve, thereby effecting the discharge of the upper end of cylinder 32 and causing the charging of the lower end thereof. This raises the slide 31 and scraper blade 35 carried thereon, thereby permitting the roll of rubber composition scraped from roll 12 to feed back into the bank of composition 16 in the bite of the rolls.

Before the carriage 21 reaches the end of its traverse, the operating lever of bleeder valve 48 encounters a dog 67 and is depressed thereby, thus causing evacuation of the air in the right hand end of bore 51 of valve 33, with the result that valve piston 50 again moves to the position shown in Figure 5, the lower end of cylinder 32 is discharged and the upper end charged, and the slide 31 is lowered to bring blade 35 again into engagement with the surface of roll 12. This occurs before the carriage 21 reaches the end of its traverse so that the blade may have time to penetrate the rubber sleeve on the mill roll before the carriage reverses its direction of travel.

This completes a cycle of operation, which operation is successively repeated as the carriage 21 approaches the limits of its traverse. The carriage 21 may be moved back and forth across the mill as long as the latter is running, or the carriage may be maintained stationary simply by disengagement of the clutch 26. The blade 35 may be lifted from the roll 12 at any time simply by use of the pull chain 72 to open the bleeder valve 46.

The construction is advantageous in that the carriage 21 is reciprocated by the power means that drives the mill rolls, and no extraneous drive means, such as the reversible motor heretofore used, is required for this purpose. Furthermore, the use of the dogs and bleeder valves for effecting operation of the cylinder 32 makes such operation fully automatic.

Modification may be resorted to without departing from the spirit of the invention or the scope thereof as defined by the appended claims.

What is claimed is:

1. In a mixer for plastic material, the combination of a mill comprising rolls for forming a thick sleeve of plastic material on one of the rolls thereof, a flat scraper blade for removing material from said mill roll, power means common to said mill rolls and said scraper blade for rotating said rolls and for moving said blade laterally back and forth parallel to said mill roll, and means for raising and lowering said scraper, off of and onto said mill roll at determinate points in its course of lateral movement.

2. In a mixer for plastic material, the combination of a mill comprising rolls for forming a thick sleeve of plastic material on one of the rolls thereof, a flat scraper blade for removing material from said mill roll, a feed shaft with return screw for propelling said scraper blade laterally back and forth parallel to the mill rolls, power means common to the mill rolls and the feed screw for rotating both of them, and means for raising and lowering said scraper relatively of said mill roll.

3. In a mixer for plastic material, the combination of a mill comprising rolls adapted to form a sleeve of plastic material on one of the rolls thereof, a scraper blade for removing material from said mill roll, a rotatable feed shaft formed with a return screw having operative connection with the scraper blade for effecting back and forth movement of the latter longitudinally of said mill roll, power means common to the mill rolls and the feed screw for rotating them, and means for moving said scraper into and out of engagement with said mill roll at determinate points along its course longitudinally of the mill roll.

4. In a mixer for plastic material, the combination of a mill comprising rolls adapted to form a sleeve of plastic material upon one of the rolls thereof, a flat scraper blade for removing material from said mill roll, a rotatable feed shaft formed with a return screw having operative connection with the scraper blade, for effecting back and forth movement of the latter longitudinally of the mill roll, power means driving the mill rolls, a driving connection between the mill rolls and the feed screw for driving the latter, said connection including a clutch, and means automatically moving said scraper blade into and out of engagement with said mill roll at determinate points along its course longitudinally of the mill roll.

TERRY W. EDWARDS.
CHARLES H. NAGEL.